(12) United States Patent
Stoll et al.

(10) Patent No.: US 7,914,051 B2
(45) Date of Patent: Mar. 29, 2011

(54) CONNECTING DEVICE FOR A FLUID LINE

(75) Inventors: Kurt Stoll, Esslingen (DE); Ulrich Kees, Homburg (DE); Harald Röhrig, Spiesen-Elversberg (DE)

(73) Assignee: Festo AG & Co. KG, Esslingen (DE)

( * ) Notice: Subject to any disclaimer, the term of this patent is extended or adjusted under 35 U.S.C. 154(b) by 743 days.

(21) Appl. No.: 11/888,000

(22) PCT Filed: Mar. 10, 2006

(86) PCT No.: PCT/EP2006/002218
§ 371 (c)(1),
(2), (4) Date: Oct. 4, 2007

(87) PCT Pub. No.: WO2006/105849
PCT Pub. Date: Oct. 12, 2006

(65) Prior Publication Data
US 2009/0033090 A1    Feb. 5, 2009

(30) Foreign Application Priority Data
Apr. 7, 2005 (DE) .......................... 10 2005 017 692

(51) Int. Cl.
*F16L 21/06* (2006.01)
(52) U.S. Cl. .................. 285/322; 285/243; 285/321
(58) Field of Classification Search .................. 285/39, 285/305, 308, 310, 921, 243–244, 257, 314, 285/321–323, 340
See application file for complete search history.

(56) References Cited

U.S. PATENT DOCUMENTS

| | | | |
|---|---|---|---|
| 4,181,329 A | 1/1980 | Helm | |
| 4,951,975 A * | 8/1990 | Bartholomew | 285/111 |
| 5,029,908 A | 7/1991 | Belisaire | |
| 5,692,784 A * | 12/1997 | Hama et al. | 285/308 |
| 5,722,696 A * | 3/1998 | Taneya | 285/39 |
| 6,499,771 B1 * | 12/2002 | Snyder et al. | 285/319 |
| 2002/0135184 A1 | 9/2002 | Snyder, Sr. et al. | |
| 2003/0001383 A1 * | 1/2003 | Halama | 285/39 |
| 2003/0122372 A1 * | 7/2003 | Muto | 285/39 |

FOREIGN PATENT DOCUMENTS

| | | |
|---|---|---|
| DE | 101 14 326 A | 10/2002 |
| DE | 103 35 530 A1 | 10/2004 |
| EP | 1 209 404 A1 | 5/2002 |
| FR | 2 622 273 A1 | 4/1989 |

* cited by examiner

*Primary Examiner* — Aaron Dunwoody
*Assistant Examiner* — Fannie Kee
(74) *Attorney, Agent, or Firm* — Hoffman & Baron, LLP

(57) ABSTRACT

A connection device for fluid lines has an annular or sleeve-shaped insert provided for assembly by plugging in a circularly cylindrical socket in a support component. The insert comprises an annular or sleeve-shaped cage element (18) in the form of a metal bent stamping with an annular support section (27) having several claw elements (33) and several support legs (34) extending from the support section in the same axial direction. The claw elements (33) serve for securing an inserted fluid line and the support legs (34) serve for supporting a preceding seal.

25 Claims, 10 Drawing Sheets

CONNECTING DEVICE FOR A FLUID LINE

BACKGROUND OF THE INVENTION

The invention relates to a connection device for a fluid line, comprising an annular or sleeve-like insert serving for assembly by plugging in a circularly cylindrical socket in a support component, such insert having a plurality of resiliently elastic claw elements, which project radially inward and are distributed in peripheral direction of the insert, for peripherally hugging an inserted fluid line, and said insert further having support means extending axially past the claw elements for supporting an annular seal surrounding the inserted fluid line.

A connection device as disclosed in the EP 1 209 404 A1 of this type comprises a cylindrical insert for assembly by plugging in a circularly cylindrical socket in a support component, as for example a housing of a fluid power component. For location within the socket anchoring projections radially extending from the insert are provided which may bite into the wall of the socket. For detachably securing an inserted fluid line a separate annular body having a plurality of claw elements is attached to the insert. In the inward direction support means, having the configuration of an annular body, extend past the claw elements, such support means serving for holding a slipped-on or molded on annular seal, through which the inserted fluid line extends.

Irrespectively of the functional advantages in the case of the known connection device there is the disadvantage of the relatively large number of components on manufacturing costs. A principal aim of the invention is accordingly seen as creating a functionally reliable connection device, which may be manufactured in a simple manner.

SUMMARY OF THE INVENTION

In order to attain this object there is a provision such that the insert includes a cage element, which is in the form of a stamped and bent metallic part and which is annular or sleeve-like, such cage element having an annular support section, from which there extend on the same axial side on the one hand some support legs constituting the support means and on the other hand the claw elements wherein both the support legs and the claw elements being formed in one piece with the support section, respectively.

The cage element of the insert combines both the claw elements serving for securing the fluid line and also the support means serving for support of the annular seal, the support means being designed in the form of individual support legs, which like the claw element are connected integrally with an annular support section of the cage element and extend therefrom. In connection with the production of the metallic bent stamping the cage element may be manufactured with its components extremely simply by a combination of stamping and bending. Despite the thinness of the material sufficient rigidity may be ensured at the support legs and also the desired resilient elasticity at the claw elements is possible.

It is inherently known as such to design the claw elements of a connection device as components of a bent stamping. In this respect the U.S. Pat. No. 5,029,908 describes a configuration, in which claw elements are part of an annular bent stamping, which is located-on an actuating ring able to be shifted axially when an inserted fluid line is to be removed again. The bent stamping in this case is not a component of an insert secured in a socket and does not perform any supporting function as regards the axially preceding seal.

Further advantageous developments of the invention are defined in the dependent claims.

It is an advantage for the support section to possess a polygonal peripheral shape with flat sections extending between the corner section. The polygonal shape of the annular support section provides for simplification of the bending operation utilized during shaping and defines clearly delimited portions for the placement of the claw elements and the support legs without mutual interference between the functions of these components.

In an appropriate design there is a provision such that the claw elements run from the flat sections and the support leg run from the corner sections or vice versa. In this case it is regarded as being particularly advantageous for the claw elements to extend from the flat sections of the support section, because here a particularly satisfactory potential for elastic deformation may be ensured. The corner sections provided with the support legs on the other hand ensure increased rigidity, something which is an advantage for the supporting function of the support legs. Nevertheless it would be in principle also possible to have a reversed order so that the claw elements extend from the corner sections and the support legs extend from the flat sections.

The production of the cage element is particularly simple if both the claw elements and also the support legs extend from the flat sections. In this case there is preferably in the peripheral direction of the cage element an alternating arrangement of the claw elements and of the support legs.

Preferably the corner sections of the support sections are rounded off. The bend radius may in this case essentially be equal to the radius of the recess provided to receive the insert. Owing to the rounded shape an improved transverse support for the insert may also be ensured. Furthermore in the case of a rounded shape it is possible to have a greater width of the corner sections so that any support legs or claw elements extending from here may be designed without a longitudinal kink or bend relatively free of trouble and as a rule on bending to make the polygonal annular shape of the cage element the bending operation can be limited to the support section without affecting the support legs or, respectively, the claw elements.

The latter correspondingly applies furthermore for the claw elements or support legs adjoining the flat sections. If the claw elements adjoin the flat sections, it is accordingly possible to define a practically linear bending zone, which favors the resiliently elastic deformation properties of the claw elements.

The end edges of the claw elements preferably exhibit a concave arcuate configuration which is delimited by two point structures. Accordingly an optimum adaptation to the configuration of the fluid line to be secured may be obtained. It is more particularly advantageous in this case to have a design in which the radius of the concave face is less than the outer radius of the fluid line to be secured. This means that on engagement of the end edges with the fluid line there is an exposed shape of in the two point structures of a respective claw element, which accordingly may bite into the wall of the fluid line to be secured with relatively little force. If the cage element for example possesses six claw elements the result will be an extremely reliable 12-point holding of the hose.

The support legs preferably alternating in the peripheral direction of the cage element with the claw elements preferably each have a limb section, extending from the support section, with a preferably linear axial extent and following this a radially inwardly extending foot section, the latter serving for supporting the associated annular seal. The base face of the foot sections may form a respective support face so that same is held captive between the support legs and a step within a circularly cylindrical socket axially. There is also the possibility of attaching the annular seal to the support legs so that it represents a component of the insert. This may be achieved by material joining by for example bonding or injection molding the seal on the support legs.

Because the support legs extend axially past the claw elements the foot sections of the support legs may be manufactured with practically any desired width without interfering with the holding function of the claw element. In this respect the claw elements and the foot sections of the support legs may readily overlap in the peripheral direction of the cage element in the spaced radial planes.

There is the advantageous possibility as well of so designing the support legs that only some of their foot sections are responsible for a direct support of the preceding annular seal. In this case the directly supporting foot sections may have such a width in the peripheral direction of the cage element? that they fit underneath the foot section or one or both of the support legs adjacent to each other in the peripheral direction. Accordingly it is possible to have a unitary support face having a relatively large extent in the peripheral direction together with an optimized supporting action for the annular seal. The underlapped foot sections expediently are also responsible for support of the annular seal but however in this case not directly but indirectly by supporting the adjacent foot sections fitting underneath them. Here there is a chance of so designing the arrangement that the support legs cooperating with an adjacent foot section are simultaneously underlapped by two foot sections and accordingly produce a simultaneous supporting action for two foot sections. The foot sections designed with a greater width may more especially have the form of annular segments, a triple arrangement joined to form an annular formation and with an arcuate length of 120 degrees each being particularly preferred.

The cage element is preferably provided with anchoring means to prevent the insert being withdrawn from the recess as direct components of the insert. In this design the anchoring means are preferably in the form of a direct component of the insert. They may for example have an annular anchoring projection or several separate anchoring projections distributed about the periphery, which during assembly of the connection device by plugging together bites or, respectively, bite into the wall of the recess in the support body and can oppose withdrawal.

In the case of a more particularly preferred configuration the at least one anchoring projection is a component of an anchoring ring separate from the cage element, and which in coaxial association with the cage element is fitted together as a unitary assembly. The anchoring ring may possess a plurality of connecting lugs distributed about its periphery, such lugs fitting axially into the cage element and being fixed in relation to it.

The connecting lugs may be like fastener eyes held by holding lugs formed on the cage element and being bent into the opening in the connecting lugs.

As simple assembly of the cage element and the anchoring ring is ensured if the anchoring ring together with connecting lugs inserted into the cage element and slipped axially onto the cage element is fixed to the cage element by detent connection.

In the case of the support component it may for example be a question of the wall of fluid power component, as for instance a valve or fluid operated drive. A separate housing to delimit the circularly cylindrical socket is unnecessary. As an alternative a support component however individual housing body may be provided, which is designed with connection means, for example a connecting thread, which render possible attachment to an interface, provided therefor, of a fluid power component.

BRIEF DESCRIPTION OF THE DRAWINGS

In the following invention will be described with reference to two working examples on the basis of the accompanying, FIGS. 1 through 8 showing a first and FIGS. 9 through 17 showing a second working example.

DETAILED DESCRIPTION OF THE PREFERRED EMBODIMENTS

The following detailed description relates to both working examples in the absence of any statement to the contrary.

Figure 1:
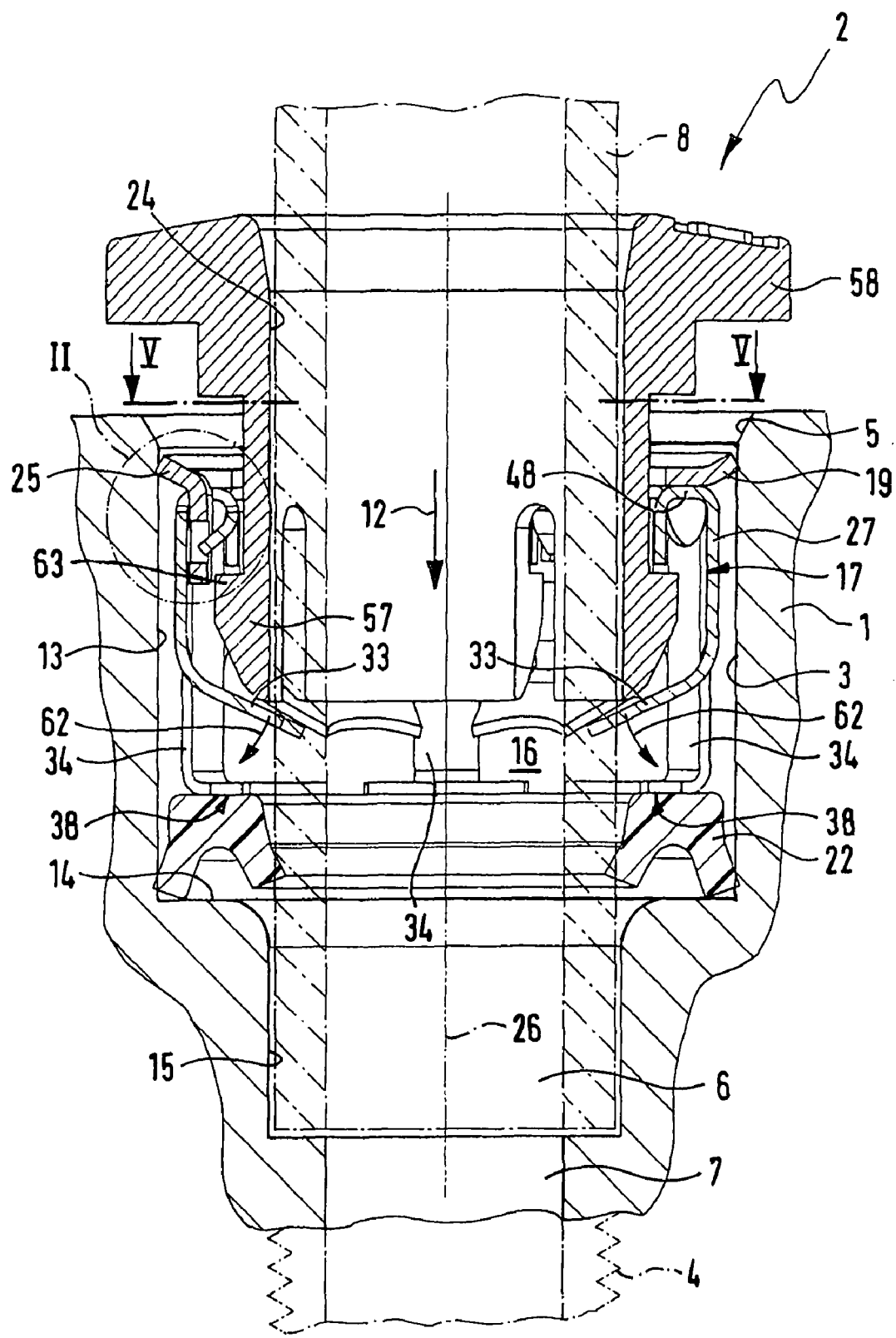
FIGS. 1 and 9 show the two working examples of the connection device in accordance with the invention in a longitudinal section with a section plane on the section line I-I of FIGS. 3 and 5 in the case of the working example of FIG. 1 and with a plane of section in accordance with the section line IX-IX of FIGS. 11 and 13 in the case of the embodiment of FIG. 9, the whole being in a condition installed in a circularly cylindrical socket in a support component ready for operation, a connected fluid line being indicated by chained lines.
Figure 9:
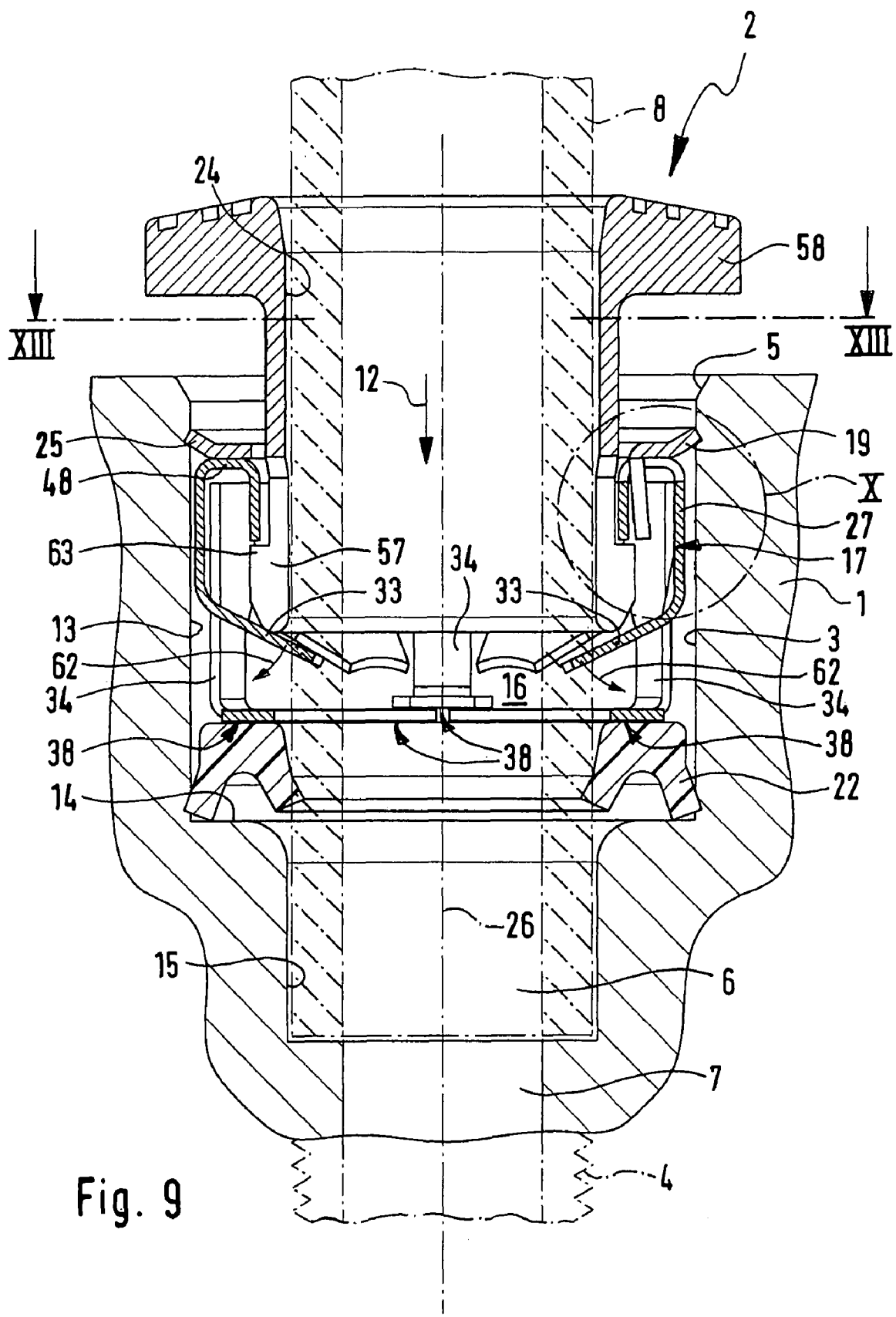

FIGS. 1 and 9 show part of a support component 1, which is fitted with a connection device 2 in accordance with the invention in a preferred form thereof. In the case of the support component 1 it is a question of the wall of the housing of fluid power component, as for instance a valve, a fluid operated drive, a compressed air servicing device or a compressed air receiver, this list having no claim to completeness.

The support component 1 is provided with a circularly cylindrical socket 3 preferably with at least one step in its diameter, into which the connection device 2 is inserted axially and held immovably. Accordingly fluid power components may be fitted with the connection device 2 without a separate housing being necessary for this.

The support component 1 may however if required right at the outset be a unitary component of the connection device 2. In this case the support component 1 will preferably be a separate housing body which has a socket 3 fitted with the connection device 2 and which furthermore possesses connection means 4 indicated in chained lines, by way of which an attachment with a suitably adapted interface of a fluid power component is possible. The connection means 4 may in this case constitute a male plug part or a threaded plug part.

The outer axial end 5 of the socket 3 is open toward an outer face of the support component 1. At its inner axial end 6 it merges with a fluid duct 7 in the support component 1 leading to other equipment.

The connection device 2 secured in the socket 3 renders possible the production of a fluid connection between a rigid or flexible duct 8, indicated in chained lines, and the fluid duct 7. During the connection operation the fluid line 8 is introduced in an insertion direction 12 into the connection device 2, in which it is then held in a preferably detachable fashion.

The socket 3 is stepped in its longitudinal direction and has a socket section 13, adjoining its outer axial end 5, with a larger diameter, which adjoins a centering section 15 at a radial step 14, said section 15 having a smaller diameter. The connection device 2 is seated in the socket section 13. The connected fluid line 8 extends through the connection device 2 and its end section fits into the centering section 15, whose diameter is the same as the outer diameter of the fluid line 8 or is slightly larger than it.

The connection device 2 possesses an annular or sleeve-like insert 17 having an axial passage 16, said insert being able to be set in position in the socket 3 during assembly by plugging. In the case of such assembly by plugging the insert 17 is thrust coaxially into the socket 3 in the insertion direction 12 with the application of a certain degree of force. The insert 17 comprises an annular or sleeve-like cage element 18 in the form of a metallic bent stamping and a separate anchoring ring 19 in the form of a subassembly. The anchoring ring 19 is placed at the end portion, facing the outer axial end 5, of the cage element 18 and is preferably also manufactured in the form of a metal bent stamping.

In an axially inward direction the cage element 18 is adjoined by a coaxially arranged annular sealing ring 22. In an axially inward direction it bears against the step 14 in the socket 3 and is acted on axially at the outside by the cage element 18. In the working embodiment it is a separate component independent of the insert 17. It is however quite possible for it to be unitary with the insert 17 if it is attached to the cage element 18.

The seal 22 is effective between the inserted fluid line 8 and the support component 1. It makes engagement with the peripheral face of the inserted fluid line 8 and the inner periphery of the socket section 13. Preferably, it is a question of a lip ring seal with one respective sealing lip for the two above mentioned sealing functions.

As a further component of the connection device 2 a release sleeve 23 is preferably present, which fits coaxially into the insert 17 and is axially movable in relation to it. The sleeve 23 possesses a passage 24 which is coaxial to the axial passage 16 and has a slightly larger diameter than the fluid line 8, which extends through the release sleeve 23.

The maximum outer diameter of the insert 17 is at every point of the its periphery equal to or slightly smaller than the inner diameter of the socket section 13. Departing from this the anchoring ring 19 has an outer diameter which is slightly larger than the inner diameter of the socket section 13 and defines a radially outwardly lying annular anchoring projection 25, which in the state plugged into the socket 3 may bite into the wall of the socket 3. As a result there is a combined force and interlocking fit as regards the support component 1, to wit independently of the material of the latter. The necessary axial hold is ensured both in the case of a support component 1 of metal and of one of plastic material.

In lieu of the annular anchoring projection 25 the anchoring ring 19 could have separate anchoring projections distributed along its periphery. It is however an advantage if the anchoring projection or projections are in engagement with the wall of the socket 3 along a single circular line centered on the longitudinal axis 26 of the socket 3.

Owing to the anchoring ring 19, which is immovably secured in position, the following cage element 18 and accordingly the entire insert 17 is fixed in the socket 3 substantially immovably.

The cage element 18 is produced from metal sheet by stamping and bending, more particularly stainless steel. For this firstly a flat blank is produced from flat material by stamping, and such blank then represents a development of the cage element 18 with all its structures. Then the individual components are bent and the cage element 18 is bodily bent as an annular or sleeve structure. This leaves an interruption 21 at one position of the periphery of the cage element 18, which is preferably left open but may be closed by welding if needed.

The cage element 18 possesses an annular, band-like narrow support section 27 with a polygonal peripheral shape. In the working embodiment illustrated in FIGS. 1 through 8 it is a question of a hexagonal configuration.

Between the individual corner sections 28 of the support section 27 there extend respective linear flat sections 29. The corner portions 28 are preferably rounded off so that they are not limited to an edge and in fact exhibit a certain extent in the peripheral direction of the cage element 18, with an at least partially curved form.

A circular line 32 comprising the outer shape of all corner sections 28 has a diameter equal to or slightly less than the inner diameter of the circularly cylindrical socket section 13. At the flat sections 29 the cage element 18 is respectively set back radially inward hexagonally in relation to the wall of the socket 3.

As has been found in the case of such a polygonal configuration manufacturing tolerances can be more readily adhered to than in the case of a circular outer periphery, which is in principle also possible, something which has a positive effect on the costs of manufacture.

The cage element 18 is a unitary component. In addition to the support section 27 it comprises inter alia a plurality of claw elements 33 and support legs 34 which are also connected integrally with the support element 27 and axially internally adjoin it as considered in the as-installed state of the connection device 2.

In the working embodiment illustrated FIGS. 1 through 8 there extends from each flat section 29 a claw element 33 which is oblique to the axis and at the same time extends radially inward. At each corner section 28 there is an adjoining support leg 34, which extends past the claw elements 33 axially.

Departing from this working example it would also be possible for the support legs 34 to extend from the flat sections 29 and for the claw elements 33 to extend from the corner sections 28.

In the working embodiment illustrated in FIGS. 9 through 17 both the claw elements 33 and also the support legs 34 start at the flat sections 29 of the support section 27. The intermediately placed corner sections 28 bear neither claw elements 33 nor support legs 34. This represents a simplification of the bending of the cage element 18 to produce the polygonal annular configuration, because neither the claw elements 33 nor the support legs 34 have to be bent over. The bending operation producing the annular form may be limited to the corner sections which preferably have a short axial length.

Even although both the claw elements 33 and also the support legs 34 are arranged on the flat sections 29, it is to be recommended to keep to an arrangement of these components alternating in the peripheral direction of the support section 27. Each claw element 33 is consequently followed by a support leg 34 which in turn is followed by a claw element 33 etc. This regular arrangement ensures an optimum holding both of the inserted fluid line 8 and also of the annular seal 22.

Since they do not have to be bent about a longitudinally extending edge, both the claw elements 33 and also the support legs 34 may each have a flat form, something which is again advantageous as regards the manufacturing costs.

The individual flat sections 29 may include sections from which neither a claw element 33 nor a support leg 34 extends. There is consequently all in all a free selection as regards the -distribution of the claw elements 33 and the support legs 34.

The claw elements 33 possess, owing to their geometrical configuration and the material selection, resiliently elastic properties. They are so deformable that the circular line 35 surrounded by their free end sections lying at the same axial level varies in diameter.

When the fluid line 8 is not inserted the claw elements 33 assume a non-deformed initial state, in which the diameter of the circular line 35 is at a minimum which is less than the outer diameter of the fluid line 8. On insertion of the fluid line 8 the line's end face will engage the oblique rear side, which is turned axially outward, of the claw elements 33 which are bend outwardly or, respectively, spread apart, on further insertion of the fluid line 8, the diameter of the circular line 35 increasing as far as the outer diameter of the fluid line 8. When the fluid line 8 has moved through the claw elements 33, the latter engage the outer periphery of the fluid line 8 so that it can not be readily pulled out again.

The support legs 34 represent support means with the purpose of locking the annular seal 22 in position. In the case of both working examples they each comprise a limb section 36, adjoining the support section 27 and extending linearly axially inward, and a plate-like foot section, which radially adjoins the limb section 36 at a bend and extends radially inward. The foot section 37 preferably has a greater width than the limb section 36, its base side directed away from the support section 27. The seal 22 is accordingly able to be supported axially at several points distributed along its periphery.

The foot sections 37 extend only so far radially inward as to ensure an unimpeded extension of the fluid line 8 through the arrangement.

Since the foot sections 37 are arranged axially more deeply in the socket 3 than the claw element 33, the foot sections cannot impair the pivoting of the claw elements 33 irrespectively of the width of the foot sections in the peripheral direction of the cage element 18. Owing to the axially staggered arrangement of the claw elements 33 and of the foot section 37 these components may overlap in the peripheral direction of the cage element 18 without any undesired effects. Such overlapping is to be readily seen in the FIGS. 5 and 8 and also FIGS. 13 and 16.

The working embodiments of FIGS. 1 through 8 will serve to show that the foot sections 37 of all support legs 34 can be designed to directly act on the annular seal 22, which is axially in front of them. In this case they are so arranged that their working faces 38 extend more or less in a common radial plane in relation to the longitudinal axis 26 and accordingly may simultaneously engage the annular seal 22 with a supporting action.

Although in the working embodiment illustrated in FIGS. 9 through 17 all foot sections 37a, 37b as well serve to axially support the annular seal 22, there is however a subdivision so that only a few of the foot sections 37a directly cooperate with the annular seal 22, whereas the other foot sections 37b are only responsible for an indirect support of the annular seal 22.

The support legs 34 directly engaging the annular seal 22 possess a longer limb section 36 than the other support legs 34 not directly in contact with the annular seal 22. The foot section 37a of the support legs 34 furthermore has, in the peripheral direction of the cage element 18, a greater width than the width of the shorter support legs 34. Combined with a sufficient width of the respective foot sections 37a there will then be the arrangement well illustrated in FIG. 16 for instance, in accordance with which the wider foot sections 37a may be tucked underneath the narrower foot sections 37b, adjacent to them in the peripheral direction of the cage element 18, of the shorter support legs 34 so that the shorter foot sections 37b may be supported by the support legs 34 in the axial direction.

In the case of the specific working embodiment the wider foot sections 37a preferably have the form of circular segments i.e. the configuration of a longitudinal section of a ring. Starting with the limb section 36 bearing them, they respectively bridge over the intermediate spaces 39 adjoining them in the peripheral direction of the cage element 18, one claw element 33 extending respectively into each such intermediate space in order to terminate together with their mutually opposite end sections 40 in the portion placed axially in front of the narrower adjacent foot section 37 and 37b toward the annular seal 22. The end sections 40 may in particular engage the support faces 38 of the narrower foot sections 37 and 37b.

Preferably the arrangement is such that each narrower foot section 37 and 37b also supports the mutually facing end sections 40 of two wider foot sections 37 and 37a sequentially following each other in the peripheral direction of the cage element 18.

Between the mutually facing end sections 40 of sequentially following wider foot sections 37 and 37a there is preferably no or only a small clearance so that all in all there is at least approximately an entire annular general support face 38a able to bear directly on the axially preceding annular seal 22.

Since the end sections 40 bear against the narrower foot sections 37b, they may despite their large peripheral length not be bent to any substantial extent and there is an extremely firm support structure for the annular seal 22.

In the working embodiment the claw elements 33 each have a neck section 42 immediately adjoining the support section 27 and due to a sort of constriction and furthermore an adjoining hugging section 43 with a greater width, such hugging section being provided to act on the outer periphery of the inserted fluid line. Owing to the narrower neck section 42 an optimum deformation of the associated hugging section 43 is ensured. The neck section 42 practically defines a bending line indicated in chained lines in FIGS. 3 and 8 and also in FIGS. 11 and 16, the hugging section 43 being able to be bent at this line. Since the neck section 42 adjoins a flat section 29 of the support section 27 the bend line 44 has a configuration parallel to the flat section 29, something which improves the resilient elasticity.

Furthermore owing to the neck section 42 a bend area is predefined about which during the shaping by bending of the cage element 18 the outer end sections of the claw elements 33 may be bent obliquely inward so that the oblique form as shown in the figures of the hugging sections 43 results.

Both the claw elements 33 and also the support legs 34 preferably have a flat shape starting adjacent to the support section 27 and extending as far as their opposite end portion. To the extent that the cage element 18 is radiused at the corner sections 28, such radiusing is preferably limited to the support section 27 portion with a smooth transition to any adjoining flat limb sections 36.

The hugging sections 43 of the claw elements 33 have their end edges 45, which are opposite to the support section 27, bearing on the outer periphery of the inserted fluid line 8. To ensure that the hugging sections not only produce force fit but also bite into the wall of the fluid line 8 and are able to cause an additional interlocking holding of the same, the edges 45 in the working example are configured in a particular way. To wit, the edges 45 possess, along their full length, a concave arcuate form with an arc radius which is less than the outer radius of the fluid line 8 to be held. This leads to two projecting point structures 46 spaced apart in the direction of the periphery of the cage element 18 for each hugging section 43, such point structures 46 limiting the concavity. The point structures are the first to engage the arcuate shape at the outer periphery of the inserted fluid line 8 and readily bite into the wall thereof irrespectively of whether it is a question of a rigid or a flexible fluid line or a fluid hose.

Figure 5:
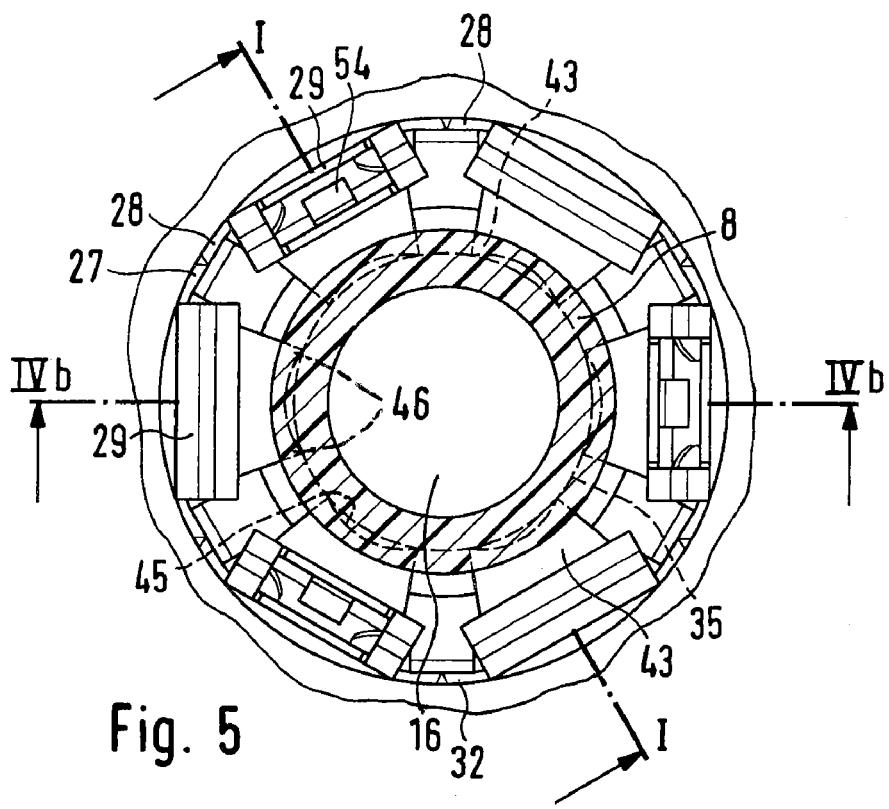
FIGS. 5 and 13 show a cross section taken through the arrangements of FIGS. 1 and 9 in accordance with the section line V-V and, respectively, XIII-XIII without showing the release sleeve and the anchoring ring.
Figure 6:
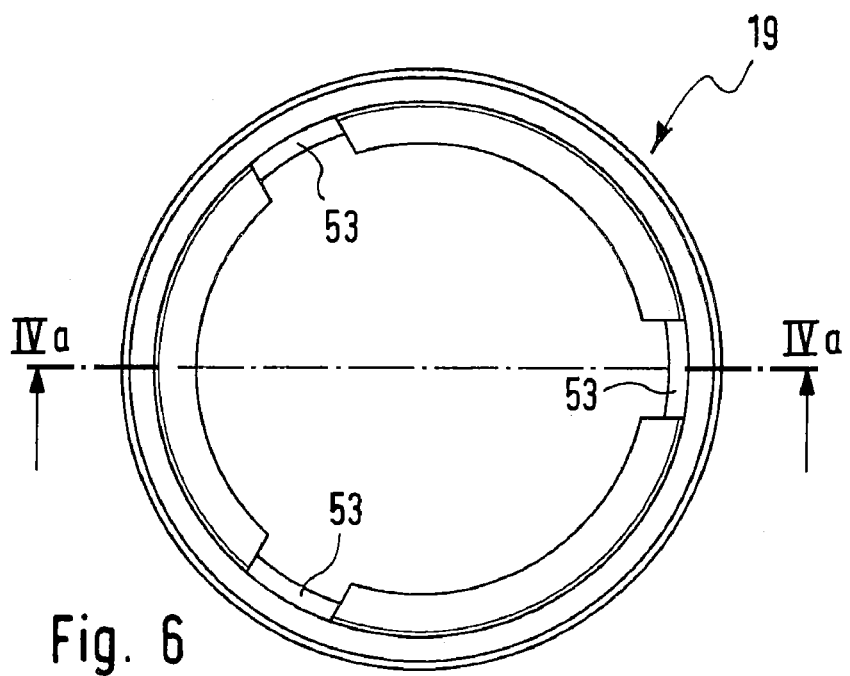
FIGS. 6 and 14 show a plan view of the anchoring ring looking in the direction of arrow VI in FIG. 4 and, respectively, the arrow XIV in FIG. 12.
Figure 7:
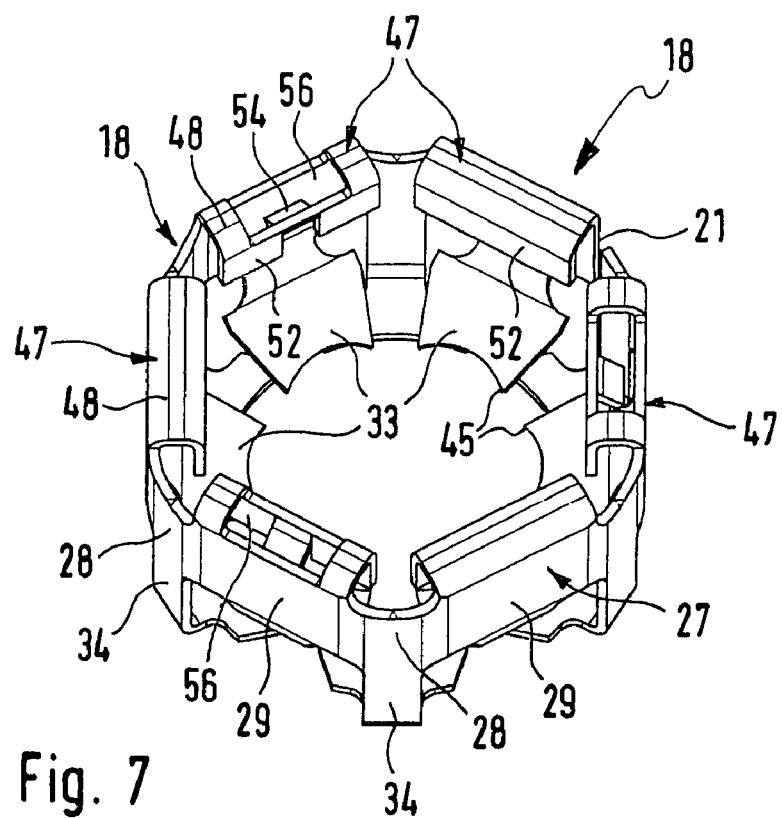
FIGS. 7 and 15 show a perspective separate view of the respective cage element looking toward the axial side which is on the outside in the fitted state.
Figure 8:
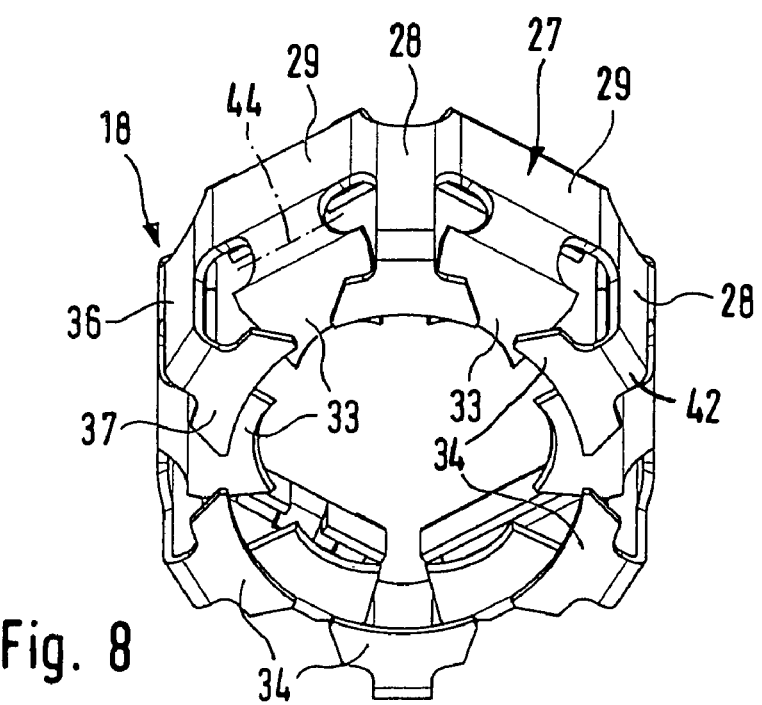
FIGS. 8 and 16 show a further perspective individual view of the cage elements looking toward the axial side which is on the inside when installed.

If the inserted fluid line 8 is subjected to a tension force opposite to the direction of insertion, be it by manual pulling or by the fluid pressure acting on the inner end face of the fluid line 8, the penetrating or bite force between the fluid line 8 and the hugging sections 43 will be increased and the hugging sections 43 may ultimately bite into the wall of the fluid line 8 along their full edge lengths as is indicated in FIG. 5.

Owing to the two point structures 46 provided for each hugging section 43 there is an extremely reliable attachment of the inserted fluid line 8 at several separate positions right from the outset and there will be a very firm hold for the inserted fluid line 8.

The above mentioned anchoring ring 19 designed separately from the cage element 18 is preferably integrated in the insert 17 owing to particularly advantageous design features and is combined with the cage element 18 in the already mentioned subassembly. At the outer axial side opposite to the claw elements 33 the cage element 18 possesses a lug section 47 on and integrated with several flat sections 29, such lug section 47 being bent radially inward to form a U-shaped structure and then axially back again. Accordingly each lug section 47 exhibits a support section 48 formed by the radially inwardly directed transverse limb of the letter U configuration and also an adjoining axially, inwardly extending limb 52 which extends spaced from and parallel to the associated flat section 29.

It is possible to provide one lug section 47 for each flat section 29. In the working embodiment illustrated in FIGS. 1 through 8 this is the case. In the case of its hexagonal cage element 18 there are accordingly six such lug sections 47. The working examples of the FIGS. 9 through 17 serve to illustrate that some of the flat sections 29 may also be designed without any lug section 47. For instance, the flat sections 29 are made with and without a lug section 47 in alternating succession in the peripheral direction of the support section 27.

The anchoring ring 19 is slipped onto the cage element 18 from the outer axial side, it bearing against the support sections 48. At the same time a plurality of its connection lugs 53 distributed about its periphery fit axially into the cage element 18. In the case of the anchoring ring 19 as well it is a question preferably of a bent stamping, manufactured from originally flat metal blank, from which the annular body is stamped with radially inwardly extending connection lugs 53, following which the connection lugs 53 are bent out of the plane of the ring in an axial direction.

In the working embodiment illustrated in FIGS. 1 through 8 the connection lugs are designed like fastener eyes. For the manufacture thereof they are preferably perforated during stamping of the above mentioned annular body.

Also with reference to the working example of FIGS. 1 through 8 it will be seen that the anchoring ring 19 is fixed in position on the cage element 18 in a non-detachable manner by holding lugs 54 made integral with the cage element 18. These holding lugs 54 fit into the openings 55 of the perforated connection lugs 53 and lead to an interlocking connection, possibly with a slight degree of axial play.

Both working examples share the feature that the connection lugs 53 each fit through a window 56, which is cut into the support section 48 of a lug section 47. The number of the connection lugs 53 may be less than that of the lug sections 47 so that it is not every support section 48 which needs a window. It is an advantage however for the connection lugs 53 to be regularly distributed about the periphery of the anchoring ring 19, the working example being designed with in all three connection lugs 53 set at an angle apart of 120 degrees. Only every second one of the lug sections 47 of the cage element 18 is provided with a window 56, through which the associated connection lugs 53 is fitted.

Figure 2:
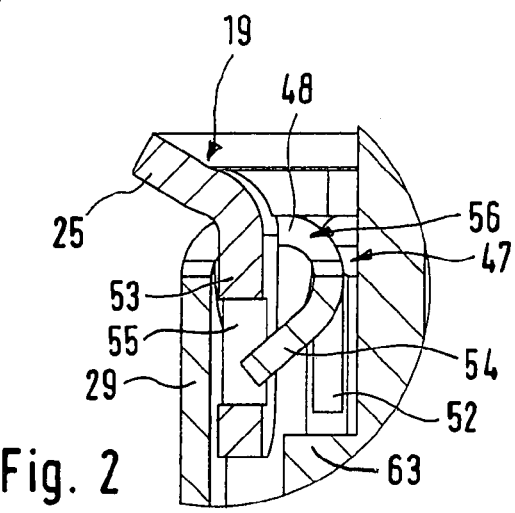
FIGS. 2 and 10 show the detail II and, respectively, X marked in the FIGS. 1 and 9 on a larger scale.
Figure 3:
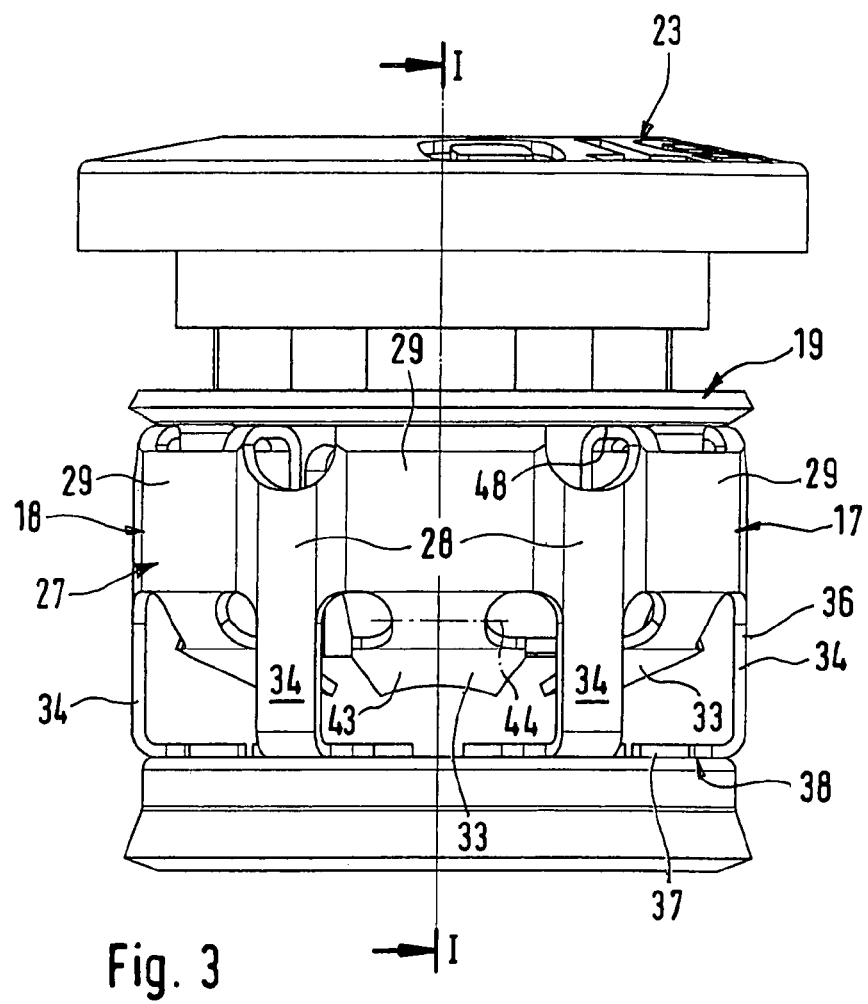
FIGS. 3 and 11 show a separate elevation of the respective connection device in a side view.
Figure 4:
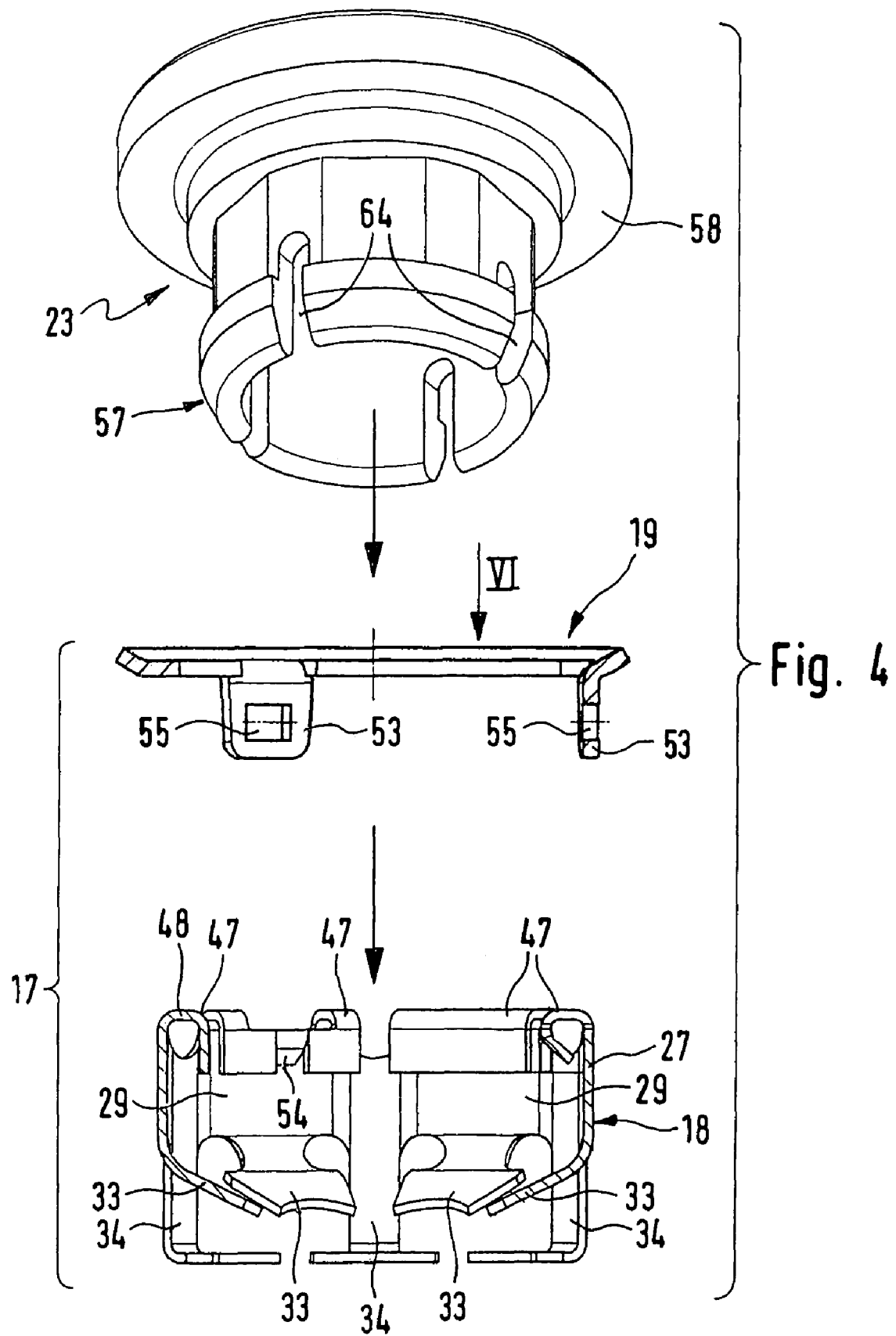
FIGS. 4 and 12 show connection devices taken to pieces, partially in longitudinal section. to wit on the section line IVa-IVa of FIG. 6 and IVb-IVb in FIG. 5 in the case of the first working embodiment and in accordance with the section line XII-XII in FIG. 14 and IX-IX in FIG. 13 in the case of the second working example, in each case without showing the associated seal.

Axially following each window 56 there is in the first working example one of the holding lugs 54. It is bent out from the limb 52 of the respective lug section 47 toward the adjacent flat section 29 and fits, more particularly obliquely, into the opening 55 lying between the flat section 29 and the limb 52, in the inserted connection lug 53. This is best seen in FIG. 2.

During the manufacture of the insert 17 firstly the cage element 18 and the anchoring ring 19 are completely manufactured with the exception of the bent out holding lugs 54. After the following fitting together the holding lugs 54 are bent into the openings 55. The holding lugs 54 will have been preferably predefined by cuts in the limb 52.

The connection between the anchoring ring 19 and the cage element 18 may have a distinct amount of axial play. The function of the connection device 2 is not impaired by this.

The second working embodiment illustrated in FIGS. 9 through 17 serves to show that the anchoring ring 19 may also be secured by a detent connection on the cage element 18. It is preferred for the connection lugs 53 in this case to be provided with detent means 59, using which they are connected with the cage element 18 by a detent engagement.

Figure 17:
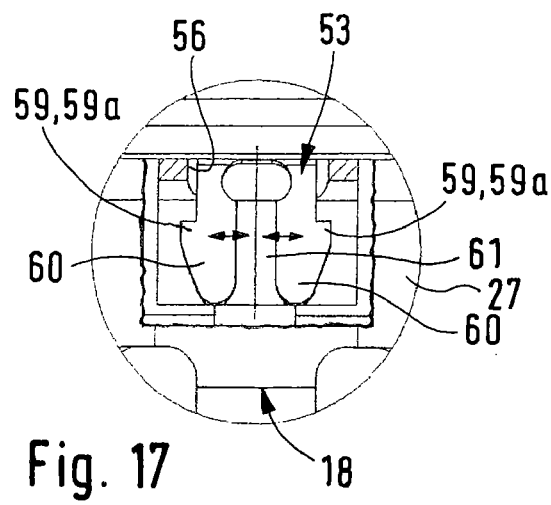
FIG. 17 shows an enlarged and partially fragmented detail as marked XVII in FIG. 12.

Preferably, as made quite clear by FIG. 17, the connection lugs 53 are longitudinally slotted so that two lug limbs 60 spaced apart and extending in parallelism to each other are produced, which have the detent means 59 respectively in the form of a detent projection 59a extending out laterally in the peripheral direction of the cage element 18. Owing to the longitudinal slot 61 extending between them and open toward the free end side of the connection lug 53 the lug limbs 60 are able to be deformed as indicated by the arrows athwart their longitudinal direction.

The overall width of the connection lug 53 at the detent projections 59a is larger than the correspondingly measured width of the window 56. Accordingly they are in a position to hook around the frame, formed by the lug section 47, of the window 56 with a detent action.

In the case of this second working embodiment the axial fitting together in position of the anchoring ring 19 and the cage element 18 is simpler than in the first working example, since after plugging together no further shaping processes is necessary.

Between the anchoring ring 19 and the cage element 18 it is quite possible to have a certain amount of axial play prior to insertion into the socket 3. After the insertion into the socket 3 the cage element 18 is trapped axially immovably between the anchored anchoring ring 19 and the annular seal 22.

Figure 10:
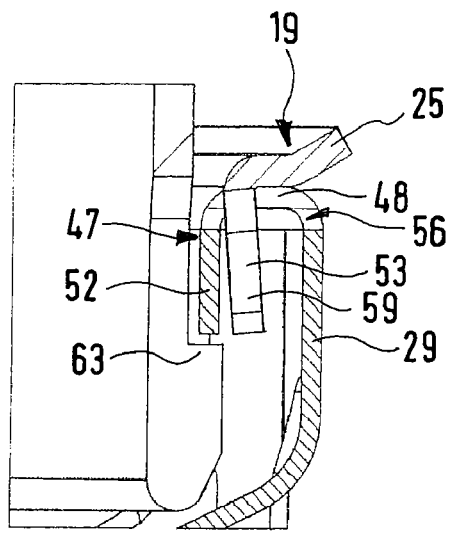
Figure 11:
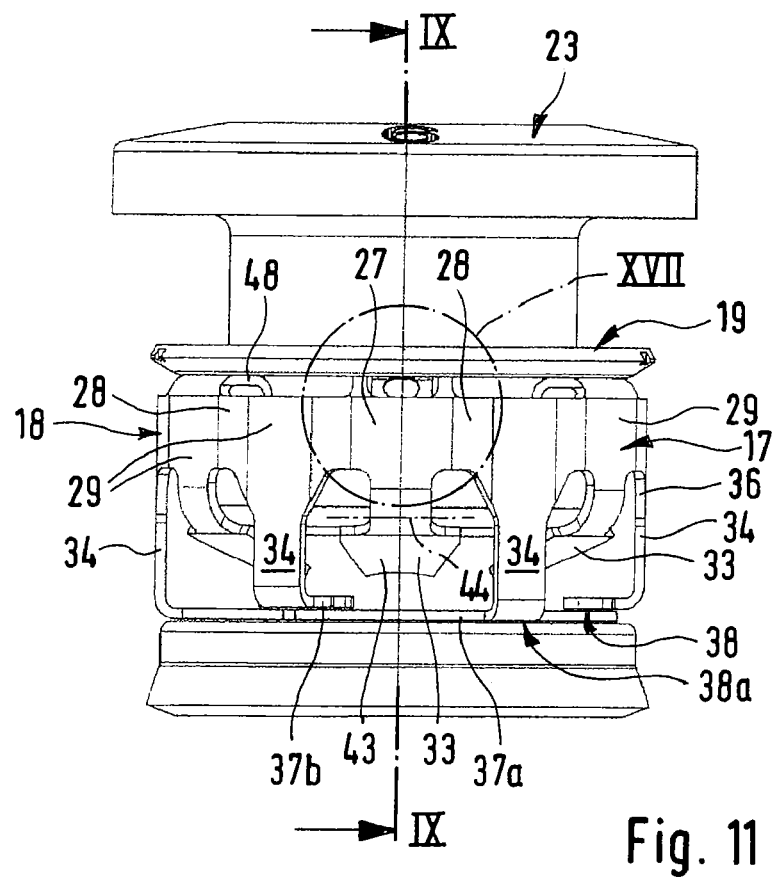
Figure 12:
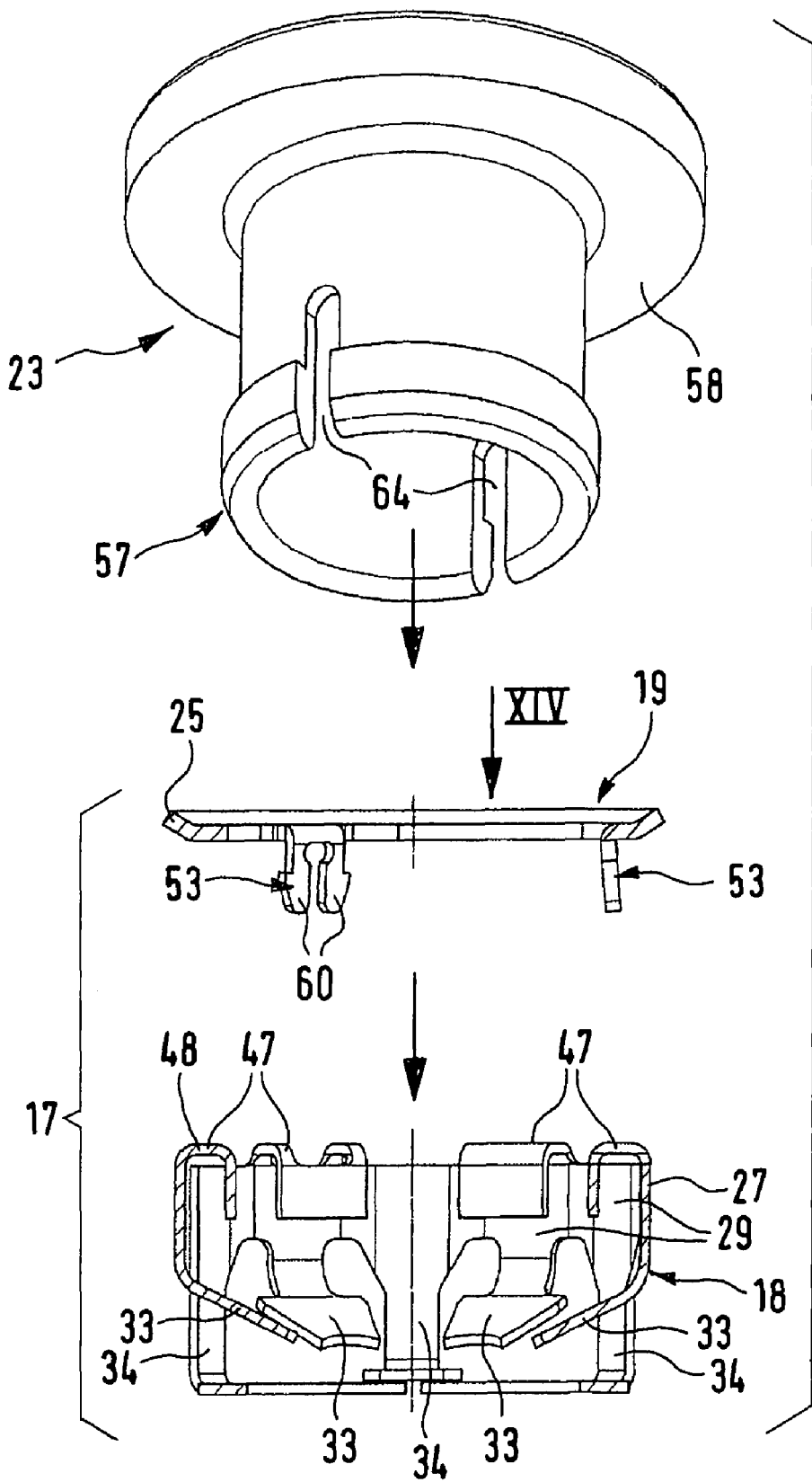
Figure 13:
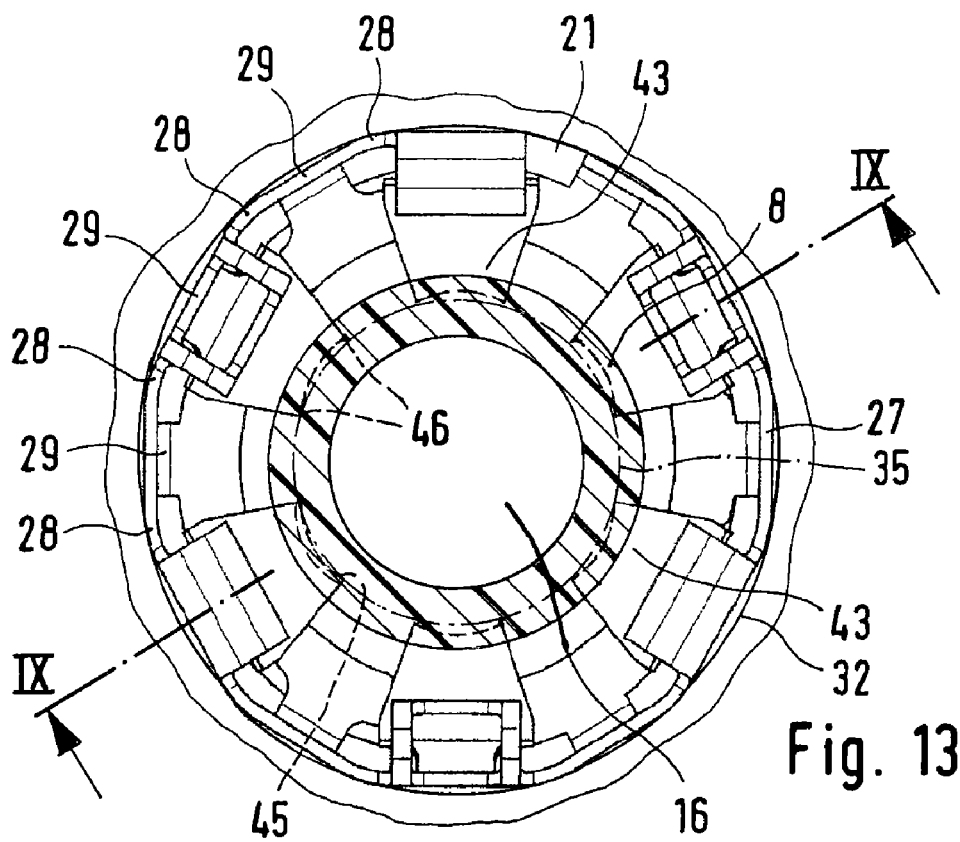
Figure 14:
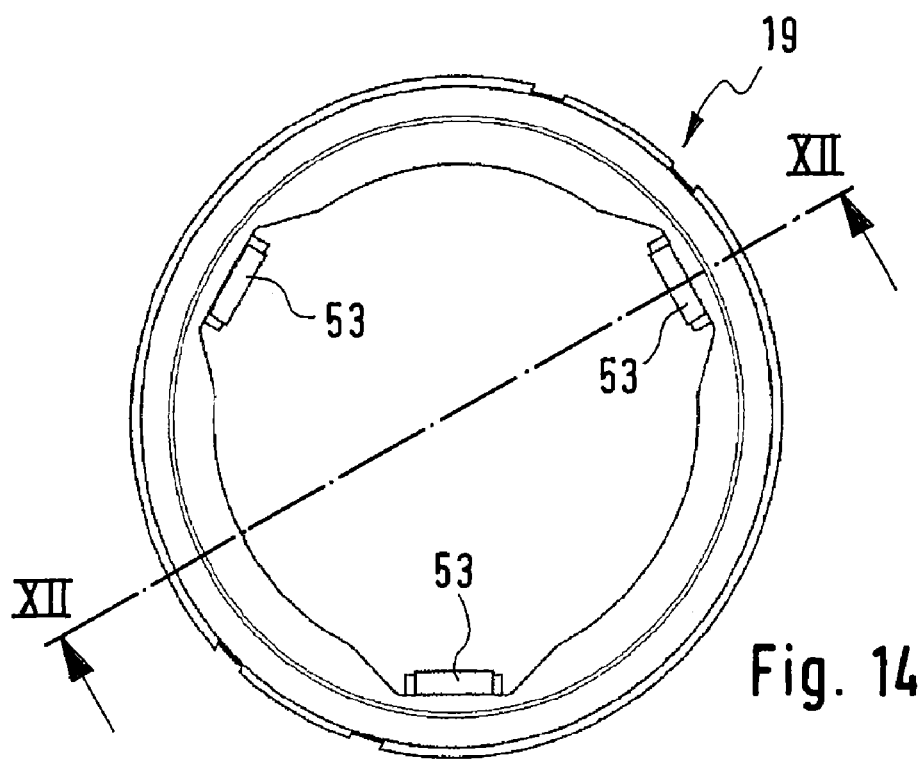
Figure 15:
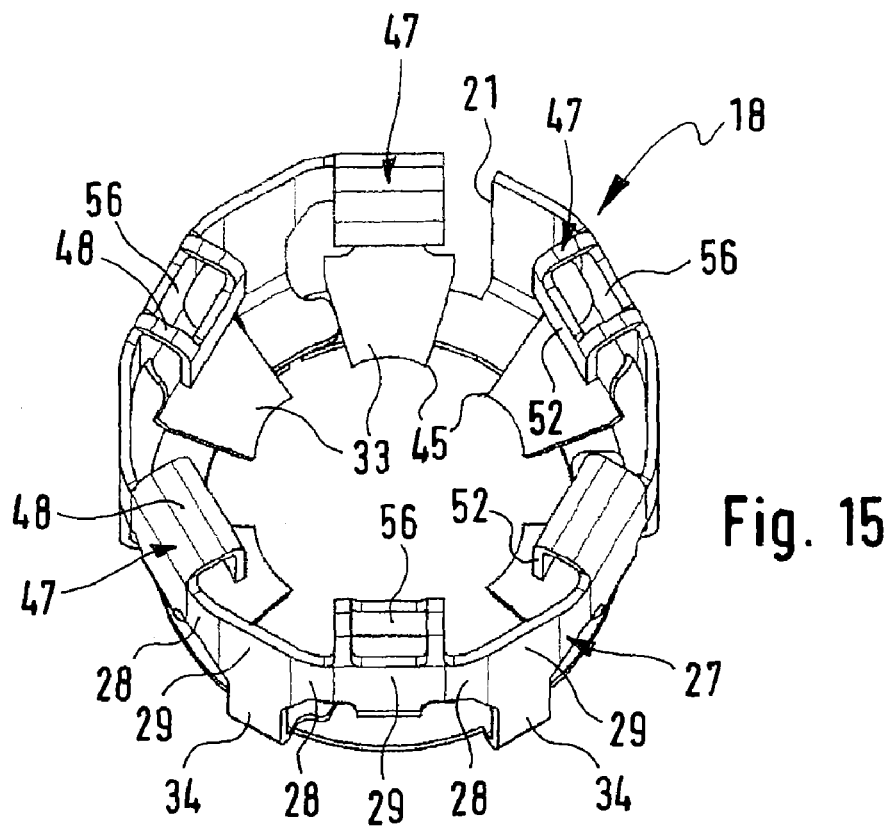
Figure 16:
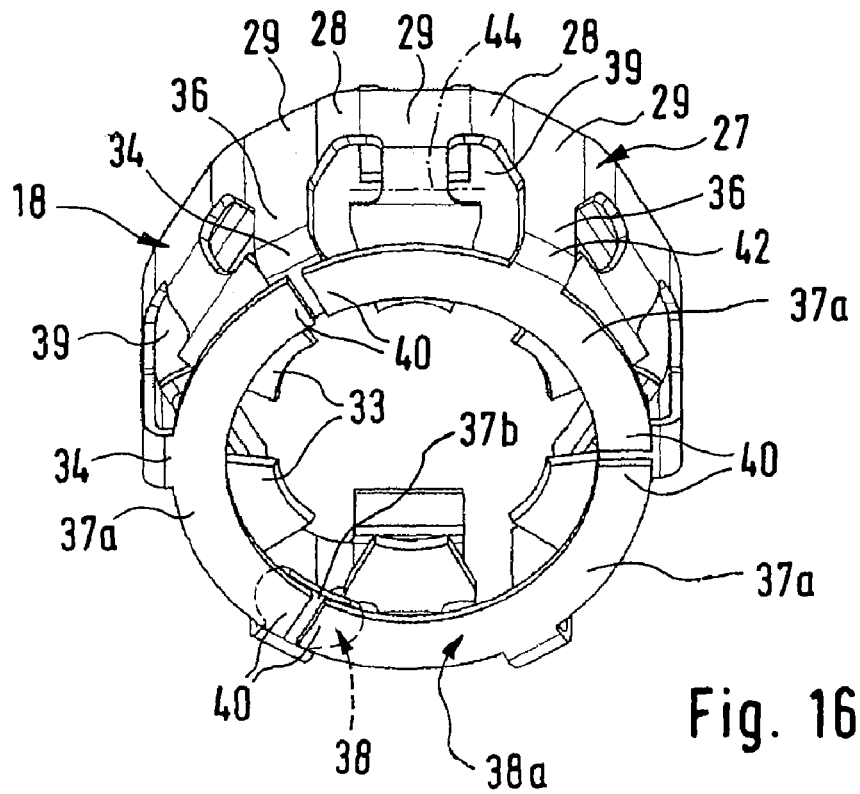

As shown in FIG. 10 the connection lugs 53 may be set slightly obliquely in relation to the longitudinal axis of the cage element 18, the free end being at an increasing distance from the said longitudinal axis.

If the cage element 18 has an interruption 21 at one point on its periphery, the connection lugs 53 fitting into the window 56 may serve to set and/or stabilize the desired ring structure.

The above mentioned release sleeve 23 inserted coaxially into the insert 17 has a thrust section 57 extending as far as just short of the axially outwardly directed rear sides of the hugging sections 43 of the claw elements 33. An actuating section 58, which is for example annular, of the release sleeve 23 extends axially outward from the insert 17 and extends past the support component 1. If a compression force is applied to the actuating section 58 in the insertion direction 12 the release sleeve 23 will be shifted inward and its thrust section 57 will be so thrust against the hugging sections 43 of the claw element 33 that same will be pivoted outward as indicated by the arrow 62 and they will be disengaged from the inserted fluid line 8. The latter may then be drawn clear of the connection device 2.

To keep it tethered and captive within the insert 17 the release sleeve 23 has (within the cage element 18) a surrounding radial projection 63 on its outer periphery to hook radially about axially inwardly directed end faces of the limbs 52. These limbs 52 therefore also perform a securing function to hold the release sleeve 23 on the insert 17.

For the simplification of fitting the release sleeve 23 the sleeve has multiple slots extending from the front end side, which faces the claw elements 33, as far as beyond the radial projection 63. Accordingly there is a segmented configuration, which is interrupted in the peripheral direction, of the hugging section 27 and of the radial projection 63. Owing to the slots 64 the individual segments of the release sleeve 23 may pivot radially inward and spring back, when the front portion (which has the radial projection 63) of the release sleeve 23 is thrust through the narrow portion (delimited by the limbs 52) of the insert 17. The release sleeve 23 is accordingly held by a detent connection between the segmented radial projection 63 and the individual lug sections 47.

The invention claimed is:

1. A connection device for connecting a support component to a fluid line, the connection device comprising:
   an annular insert adapted for plugging in a circularly cylindrical socket of a support component; and
   an annular seal adapted for surrounding a fluid line inserted into the connection device,
   wherein the annular insert comprises:
      a plurality of resiliently elastic claw elements projecting radially inward and being distributed in the peripheral direction of the insert, for peripherally hugging the inserted fluid line;
      support means defined by a plurality of individual support legs extending axially past the claw elements for supporting the annular seal surrounding the inserted fluid line; and
      an annular cage element which is made in the form of a metallic bent stamping, the cage element having an annular support section, wherein the claw elements and the support legs project from the annular support section in the same axial direction, and wherein both the support legs and the claw elements are formed in one piece with the support section, and wherein the support section has a polygonal shape defined by flat sections and corner sections, each flat section extending between two corner sections.

2. The connection device as set forth in claim 1, wherein the corner sections are curved and have radii.

3. The connection device as set forth in claim 1, wherein the claw elements extend from the flat sections and the support legs extend from the corner sections.

4. The connection device as set forth in claim 1, wherein both the claw elements and the support legs extend from the flat sections of the support section.

5. The connection device as set forth in claim 4, wherein the support legs and the claw elements are arranged on the flat sections in alternating succession in the peripheral direction of the support section.

6. The connection device as set forth in claim 1, wherein the claw elements have end edges facing the fluid line to be secured, and wherein the end edges of the claw elements have a concave arcuate form extending between two tips spaced apart in the peripheral direction of the cage element.

7. The connection device as set forth in claim 1, wherein the support legs respectively have a limb section extending axially from the support section and a foot section adjoining the limb section and extending radially inwardly.

8. The connection device as set forth in claim 7, wherein the foot section of each of the support legs has a base face axially turned away from the support section, and wherein the base face of the foot sections of some or all of the support legs forms a support face provided for acting on the annular seal.

9. The connection device as set forth in claim 8, wherein the foot sections of several support legs are designed to directly act on the annular seal, such foot sections having such a width in the peripheral direction of the cage element that such foot sections hook underneath the foot section of at least one support leg adjoining it in the peripheral direction of the cage element and for their part are supported by the foot section underneath which they are hooking.

10. The connection device as set forth in claim 7, wherein the foot sections of the support legs overlap in the peripheral direction of the cage element with those claw elements which are respectively adjacent in said peripheral direction.

11. The connection device as set forth in claim 1, further comprising anchoring means associated with the cage element for axially fixed anchoring in the circularly cylindrical socket of the support component.

12. The connection device as set forth in claim 11, wherein the anchoring means are part of the insert.

13. The connection device as set forth in claim 11, wherein the anchoring means comprises at least one anchoring projection extending beyond the outline of the cage element.

14. The connection device as set forth in claim 13, wherein the at least one anchoring projection is part of a separate anchoring ring which is compounded in a coaxial arrangement with the cage element so as to form a structural unit.

15. The connection device as set forth in claim 14, wherein the at least one anchoring projection is constituted by a radially externally arranged edge section of the anchoring ring.

16. The connection device as set forth in claim 14, wherein the anchoring ring is plugged onto the cage element at the axial side thereof which is opposite to the claw element.

17. The connection device as set forth in claim 16, wherein the anchoring ring has a plurality of connection lugs distributed about its periphery and axially extending into the cage element, the connection lugs having openings and wherein the anchoring ring is axially secured on the cage element by means of holding lugs bent into the openings in the connection lugs.

18. The connection device as set forth in claim 14, wherein the anchoring ring is attached to the cage element with a detent action.

19. The connection device as set forth in claim 18, wherein the anchoring ring has a plurality of connection lugs distributed along its periphery extending axially into the cage element, the connection lugs having detent means, by way of which the connection lugs are connected with the cage element with a detent engagement.

20. The connection device as set forth in claim 19, wherein the connection lugs respectively penetrate through a window defined by a frame formed in the cage element and possess transversely projecting detent projections, which hook underneath the frame of the window with a detent effect.

21. The connection device as set forth in claim 20, wherein the window is formed in a radially inwardly extending transverse limb of a U-bent lug section of the cage element.

22. The connection device as set forth in claim 21, wherein the U-bent lug section is integrally joined to the support section of the cage element in one piece.

23. The connection device as set forth in claim 1, further comprising a release sleeve which moves axially in relation to the insert and which extends from the outside axially into the insert and has a thrust section axially externally opposite to the claw elements.

24. A connection device for connecting a support component to a fluid line, the connection device comprising:
   an annular insert adapted for plugging in a circularly cylindrical socket of a support component; and
   an annular seal adapted for surrounding a fluid line inserted into the connection device,
   wherein the annular insert comprises:
      a plurality of resiliently elastic claw elements projecting radially inward and being distributed in the peripheral direction of the insert, for peripherally hugging the inserted fluid line;
      support means defined by a plurality of individual support legs extending axially past the claw elements for supporting the annular seal surrounding the inserted fluid line;
      an annular cage element which is made in the form of a metallic bent stamping, such cage element having an annular support section, wherein the claw elements and the support legs project from the annular support section in the same axial direction, and wherein both the support legs and the claw elements are formed in one piece with the support section; and
      anchoring means attached to the cage element for axially fixing the insert in the circularly cylindrical socket of the support component, the anchoring means including at least one anchoring projection extending beyond the outline of the cage element, the anchoring projection being part of a separate anchoring ring disposed in a coaxial arrangement with the cage element so as to form a structural unit, wherein the anchoring ring is plugged onto the cage element at the axial side thereof which is opposite to the claw element, and wherein the anchoring ring has a plurality of connection lugs distributed about its periphery and axially extending into the cage element, the connection lugs having openings and wherein the anchoring ring is axially secured on the cage element by means of holding lugs bent into the openings in the connection lugs.

25. A connection device for connecting a support component to a fluid line, the connection device comprising:
   an annular insert adapted for plugging in a circularly cylindrical socket of a support component; and
   an annular seal adapted for surrounding a fluid line inserted into the connection device,
   wherein the annular insert comprises:
      a plurality of resiliently elastic claw elements projecting radially inward and being distributed in the peripheral direction of the insert, for peripherally hugging the inserted fluid line;
      support means defined by a plurality of individual support legs extending axially past the claw elements for supporting the annular seal surrounding the inserted fluid line;
      an annular cage element which is made in the form of a metallic bent stamping, such cage element having an annular support section, wherein the claw elements and the support legs project from the annular support section in the same axial direction, and wherein both the support legs and the claw elements are formed in one piece with the support section; and
      anchoring means attached to the cage element for axially fixing the insert in the circularly cylindrical socket of the support component, the anchoring means including at least one anchoring projection extending beyond the outline of the cage element, the anchoring projection being part of a separate anchoring ring disposed in a coaxial arrangement with the cage element so as to form a structural unit, and wherein the anchoring ring is attached to the cage element with a detent structure.

* * * * *